United States Patent
Chen et al.

(10) Patent No.: US 8,533,369 B2
(45) Date of Patent: *Sep. 10, 2013

(54) SMART CARD DRIVEN DEVICE CONFIGURATION CHANGES

(75) Inventors: Xuming Chen, San Ramon, CA (US); Bjorn Lennart Hjelm, Livermore, CA (US); Praveen Venkataramu, Bridgewater, NJ (US); Andrew Youtz, Rocky Hill, NJ (US)

(73) Assignees: Cellco Partnership, Basking Ridge, NJ (US); Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,858

(22) Filed: May 16, 2012

(65) Prior Publication Data

US 2012/0233357 A1    Sep. 13, 2012

Related U.S. Application Data

(63) Continuation of application No. 12/850,678, filed on Aug. 5, 2010, now Pat. No. 8,200,854.

(51) Int. Cl.
*G06F 3/00* (2006.01)
*G06F 13/00* (2006.01)

(52) U.S. Cl.
USPC ............... 710/8; 455/558; 455/411; 711/115

(58) Field of Classification Search
USPC ....... 710/8–13; 455/550–558, 411; 711/115; 709/228; 235/380
See application file for complete search history.

(56) References Cited

U.S. PATENT DOCUMENTS

| | | | |
|---|---|---|---|
| 6,463,200 B2 | 10/2002 | Fink et al. | |
| 7,886,355 B2 | 2/2011 | Rager et al. | |
| 8,200,854 B2 * | 6/2012 | Chen et al. | 710/8 |
| 2005/0009563 A1 | 1/2005 | Stenmark | |
| 2005/0020286 A1 | 1/2005 | Lazaridis et al. | |
| 2005/0094592 A1 | 5/2005 | Schmidt | |
| 2005/0181829 A1 | 8/2005 | Cho et al. | |
| 2006/0094423 A1 | 5/2006 | Sharma et al. | |
| 2006/0116169 A1 | 6/2006 | Park | |
| 2006/0199613 A1 | 9/2006 | Almgren | |
| 2007/0198975 A1 | 8/2007 | Alnas et al. | |
| 2008/0288585 A1 | 11/2008 | Choi et al. | |
| 2009/0037846 A1 | 2/2009 | Spalink et al. | |
| 2010/0017301 A1 | 1/2010 | Alva | |
| 2010/0138547 A1 | 6/2010 | Knapp | |
| 2010/0275010 A1 | 10/2010 | Ghirardi | |
| 2011/0035286 A1 | 2/2011 | Kim et al. | |
| 2011/0119739 A1 | 5/2011 | Medvinsky et al. | |
| 2011/0136471 A1 | 6/2011 | Chen et al. | |

* cited by examiner

*Primary Examiner* — Chrisotpher Shin

(57) ABSTRACT

A smart card determines if the smart card has been inserted into a device, and retrieves a device identifier and at least one application configuration value from the device if the smart card has been inserted into the device. The smart card compares the retrieved device identifier and the at least one application configuration value with a device identifier and at least one application configuration value previously stored in the smart card. The smart card causes the retrieved device identifier and the at least one application configuration value to be sent to an Over The Air (OTA) server if the comparison indicates that the retrieved device identifier or the at least one application configuration value is different than the previously stored device identifier or the at least one application configuration value, so that the OTA server can supply application parameter changes to the mobile device for future device operation.

20 Claims, 8 Drawing Sheets

US 8,533,369 B2

SMART CARD DRIVEN DEVICE CONFIGURATION CHANGES

RELATED APPLICATION

The present application is a continuation of U.S. application Ser. No. 12/850,678, entitled "Smart Card Driven Device Configuration Changes" and filed Aug. 5, 2010 and issued as U.S. Pat. No. 8,200,854 on Jun. 12, 2012, the disclosure of which is incorporated by reference herein in its entirety.

BACKGROUND

Smart cards typically consist of pocket-sized, or smaller, cards with embedded integrated circuits. Memory cards and microprocessor cards are two categories of smart cards. Memory cards contain only non-volatile memory storage components. Microprocessor cards contain memory storage components and microprocessor components.

Subscriber Identity Module (SIM), Universal Integrated Circuit Cards (UICCs), and Removable User Identify (R-UIM) cards are examples of microprocessor smart cards. SIM cards securely store an identifier or key used to identify a subscriber on mobile telephone devices (e.g., cellular radiotelephones). SIM cards enable users to change phones by removing the SIM card from one telephony device and inserting it into another telephony device. UICCs are smart cards used in mobile terminals in Global System for Mobile Communications (GSM) and Universal Mobile Telecommunications System (UMTS) networks. UICCs ensure the integrity and security of different types of personal data, and may include several applications that permit access to both GSM and UMTS networks. R-UIMs include cards having features that are usable with Code Division Multiple Access (CDMA), GSM and UMTS devices.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein employ a smart card inserted into a device (e.g., into a mobile telephone) to drive configuration changes associated with the operation of the mobile device. Such configuration changes may include changes in Access Point Names (APNs), Network Access Identifiers (NAIs), Multi-Media Messaging Service (MMS) information, Wireless Application Protocol (WAP) information, application keys, and other data associated with the operation of the mobile device. The smart card may include a Universal Integrated Circuit Card (UICC), a removable user identity card (R-UIM), a subscriber identity module (SIM), a universal subscriber identity module (USIM), or an Internet Protocol (IP) multimedia services identity module (ISIM) that may be inserted into the device for driving the application configuration parameter changes.

Figure 1:
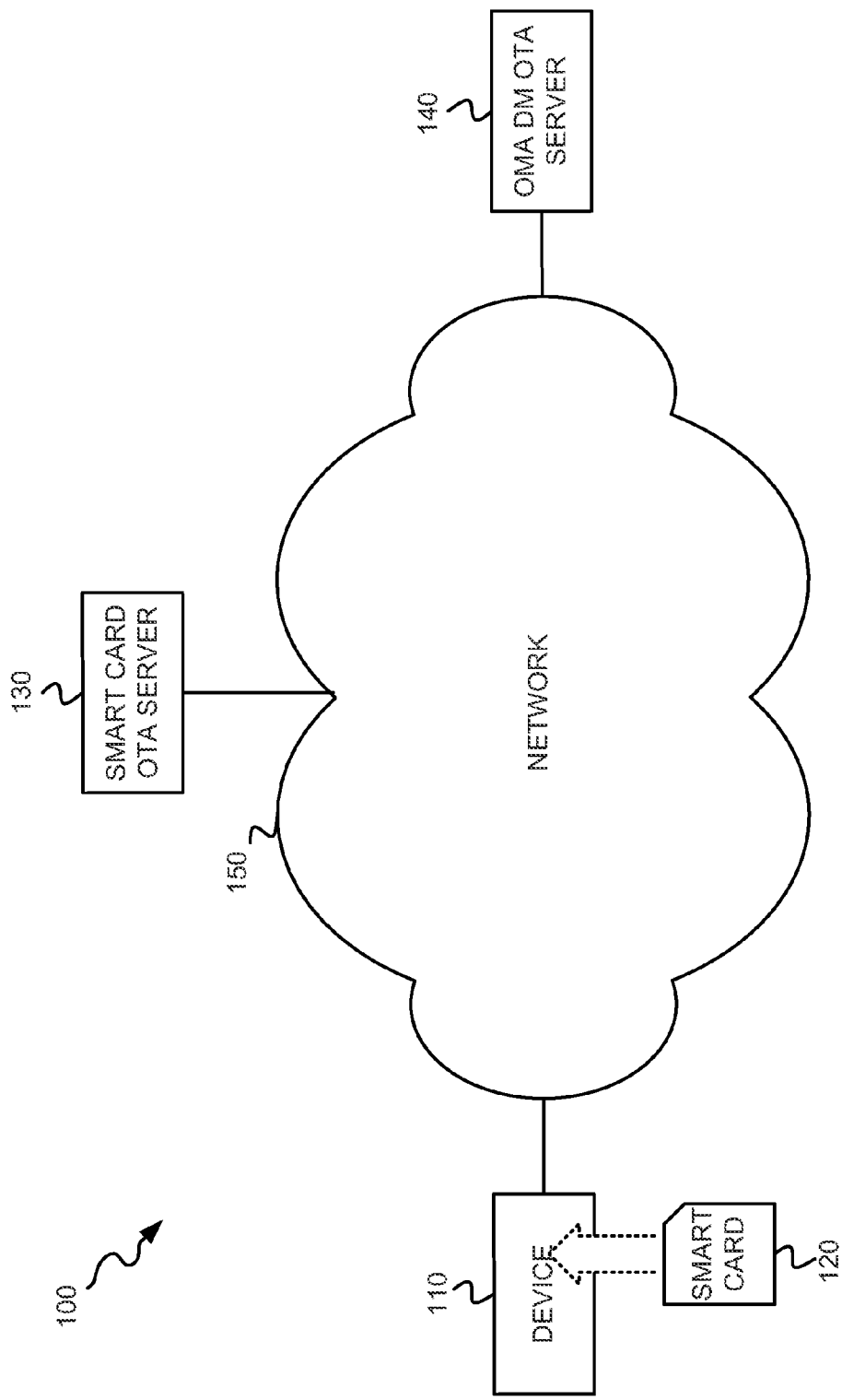
FIG. 1 is a diagram that depicts an exemplary environment in which smart card driven device configuration changes may be implemented.

FIG. 1 is a diagram that depicts an exemplary environment 100 in which smart card driven device configuration changes may be implemented. Environment 100 may include a device 110, into which a smart card 120 is inserted, a smart card Over the Air (OTA) server 130, an Open Mobile Alliance (OMA) Device Management (DM) OTA server 140, and a network 150.

Device 110 may include any type of electronic device that includes an interface for inserting smart card 120. Device 110 may include any type of communication device that uses a Universal Integrated Circuit Card (UICC)-based SIM for authentication and application enabling. Device 110 may include, for example, a cellular radiotelephone, a smart phone, a personal digital assistant (PDA), a laptop computer, a palmtop computer, a gaming device, a media player device, a tablet computer, or a digital camera that includes communication capabilities (e.g., wireless communication mechanisms).

Smart card 120 may include any type of smart card usable for inserting in device 110 and for storing information or data relevant to the operation of device 110. Smart card 120 may, for example, include a Universal Integrated Circuit Card (UICC), a removable user identity card (R-UIM), a SIM, a USIM, or an ISIM.

Smart card OTA server 130 may include a server entity that may communicate with smart card 120 via network 150. In some implementations, such communication may include the receipt of Terminal Profile Numbers (TPNs), device identifiers (e.g., International Mobile Equipment Identities (IMEIs)) and/or Application Configuration Tracking Values (ACTVs) from smart card 120. Smart card OTA server 130 may also communicate with OMA DM OTA server 140. In some embodiments (e.g., the exemplary embodiment described with respect to FIG. 6 below), smart card OTA server 130 may send application parameters changed application parameters) to smart card 120 via device 110.

OMA DM OTA server 140 may include a server entity that may implement the OMA DM device management protocol for managing devices, such as for example, mobile phones, PDAs and palm top computers. OMA DM OTA server 140 may configure the devices, including device 110, by supplying application parameters used in the operation of the devices, may enable and disable features of the devices, and may change settings of the devices. OMA DM OTA server 140 may also provide software upgrades to the devices, and may provide fault management of the devices (e.g., report errors from the devices, etc.). In embodiments described herein (i.e., the exemplary embodiment described with respect to FIGS. 4A & 4B below), OMA DM OTA server 140 may send application configuration parameter changes to device 110.

Network 150 may include one or more networks of any type, such as, for example, a telecommunications network (e.g., a Public Switched Telephone Network (PSTN) or Public Land Mobile Network (PLAIN)), a local area network (TAN), a wide area network (WAN), a metropolitan area network (MAN), an intranet, the Internet, a wireless satellite network, a cable network (e.g., an optical cable network), and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

The configuration of environment 100 depicted in FIG. 1 is for illustrative purposes only. It should be understood that other configurations may be implemented. Therefore, environment 100 may include additional, fewer and/or different components than those depicted in FIG. 1. For example, though only a single device 110 with a single smart card 120 is shown in FIG. 1, multiple devices 110 may connect to network 150, each with its own smart card 120.

Figure 2:
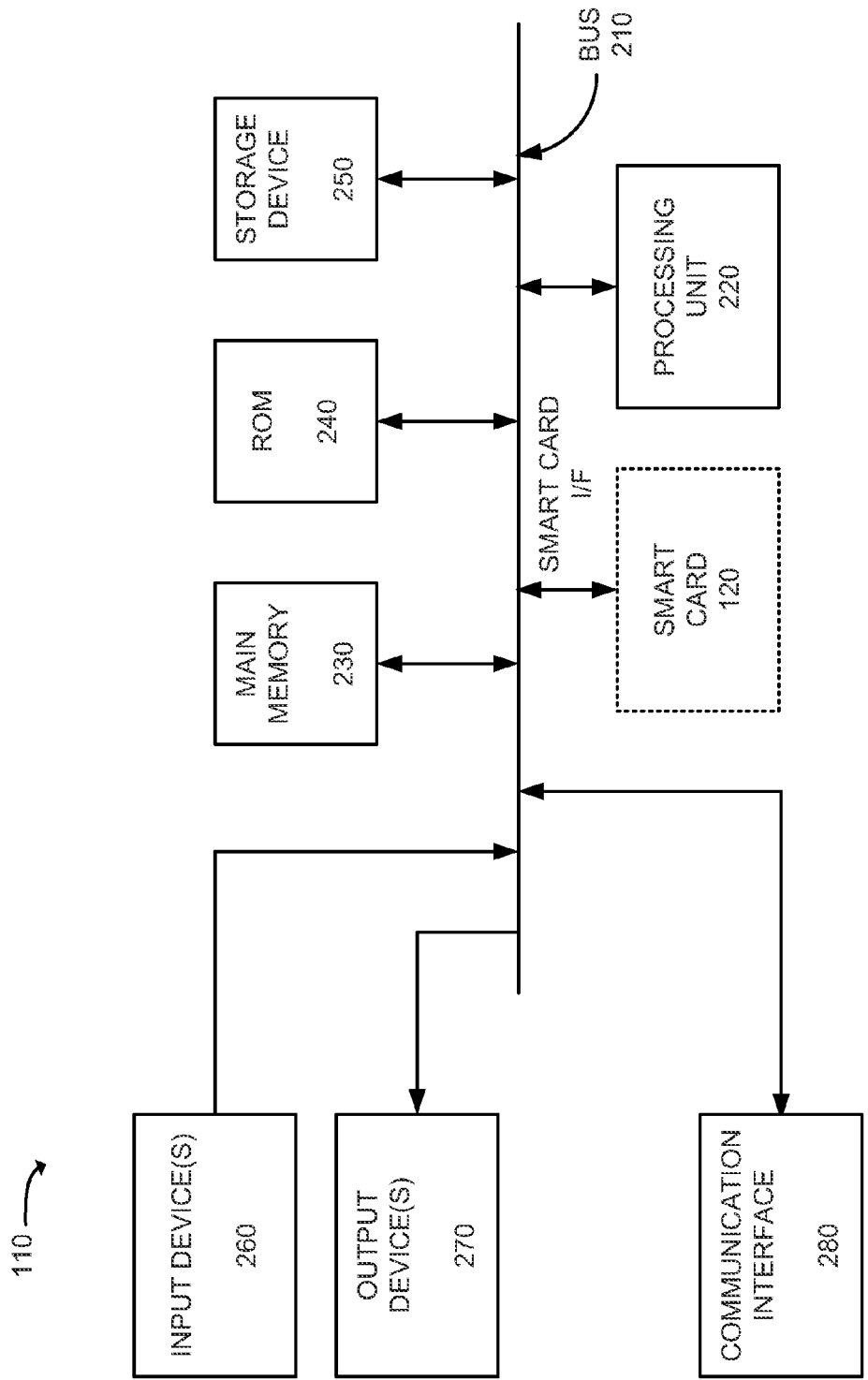
FIG. 2 is a diagram of exemplary components of the device depicted in FIG. 1.

FIG. 2 is a diagram of exemplary components of device 110. Device 110 may include a bus 210, a processing unit 220, a main memory 230, a read only memory (ROM) 240, a storage device 250, an input device(s) 260, an output device(s) 270, and a communication interface 280. Bus 210 may include a path that permits communication among the elements of device 200. As further shown in FIG. 2, smart card 120 may be inserted into a smart card interface (I/F) of device 110. Servers 130 and 140 may be similar configured to device 110 shown in FIG. 2.

Processing unit 220 may include a processor, microprocessor, or processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and instructions for use by processing unit 220. Storage device 250 may include a magnetic and/or optical recording medium and its corresponding drive.

Input device(s) 260 may include one or more mechanisms that permit an operator to input information to device 200, such as, for example, a keypad or a keyboard, voice recognition and/or biometric mechanisms, etc. Output device(s) 270 may include one or more mechanisms that output information to the operator, including a display, a speaker, etc. Communication interface 280 may include any transceiver mechanism that enables device 200 to communicate with other devices and/or systems. For example, communication interface 280 may include mechanisms for communicating with another device or system via a network, such as network 150.

Device 110 may perform certain operations or processes, as may be described in detail below. Device 110 may perform these operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices.

The software instructions may be read into main memory 230 from another computer-readable medium, such as storage device 250, or from another device via communication interface 280. The software instructions contained in main memory 230 may cause processing unit 220 to perform operations or processes that will be described later. Alternatively, hardwired circuitry may be used in place of or in combination with software instructions to implement processes consistent with the principles of the invention. Thus, exemplary implementations are not limited to any specific combination of hardware circuitry and software.

The configuration of components of device 110 illustrated in FIG. 2 is for illustrative purposes only. It should be understood that other configurations may be implemented. Therefore, device 110 may include additional, fewer and/or different components than those depicted in FIG. 2.

Figure 3:
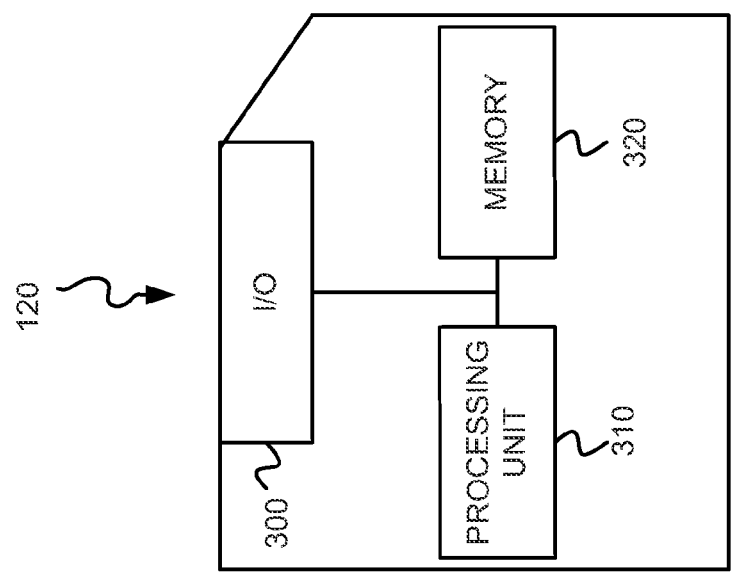
FIG. 3 is a diagram that depicts exemplary components of the smart card depicted in FIG. 1.

FIG. 3 is a diagram that depicts exemplary components of smart card 120. Smart card 120 may include input/output circuitry 300, a processing unit 310, and a memory 320. Input/output circuitry 300 may include circuitry for inputting data to smart card 120 from device 110, and output circuitry for outputting data from smart card 120 to device 110. Processing unit 310 may include a processor, microprocessor, or processing logic that may interpret and execute instructions. Memory 320 may include RAM, ROM, and/or Electrically Erasable Programmable Read-Only Memory (EEPROM) that may store data (e.g., TPN, IMEI and/or ACTV values), and may store instructions for execution by processing unit 310.

Smart card 120 may perform certain operations or processes, as may be described in detail below. Smart card 120 may perform these operations in response to processing unit 310 executing software instructions contained in a computer-readable medium, such as memory 320. A computer-readable medium may be defined as a physical or logical memory device. A logical memory device may include memory space within a single physical memory device or spread across multiple physical memory devices.

The software instructions contained in memory 320 may cause processing unit 310 to perform operations or processes that will be described later. Alternatively, hardwired circuitry may be used in place of or in combination with software instructions to implement processes consistent with the principles of the invention. Thus, exemplary implementations are not limited to any specific combination of hardware circuitry and software.

The configuration of components of smart card 120 illustrated in FIG. 3 is for illustrative purposes only. It should be understood that other configurations may be implemented. Therefore, smart card 120 may include additional, fewer and/or different components than those depicted in FIG. 3.

Figure 4A:
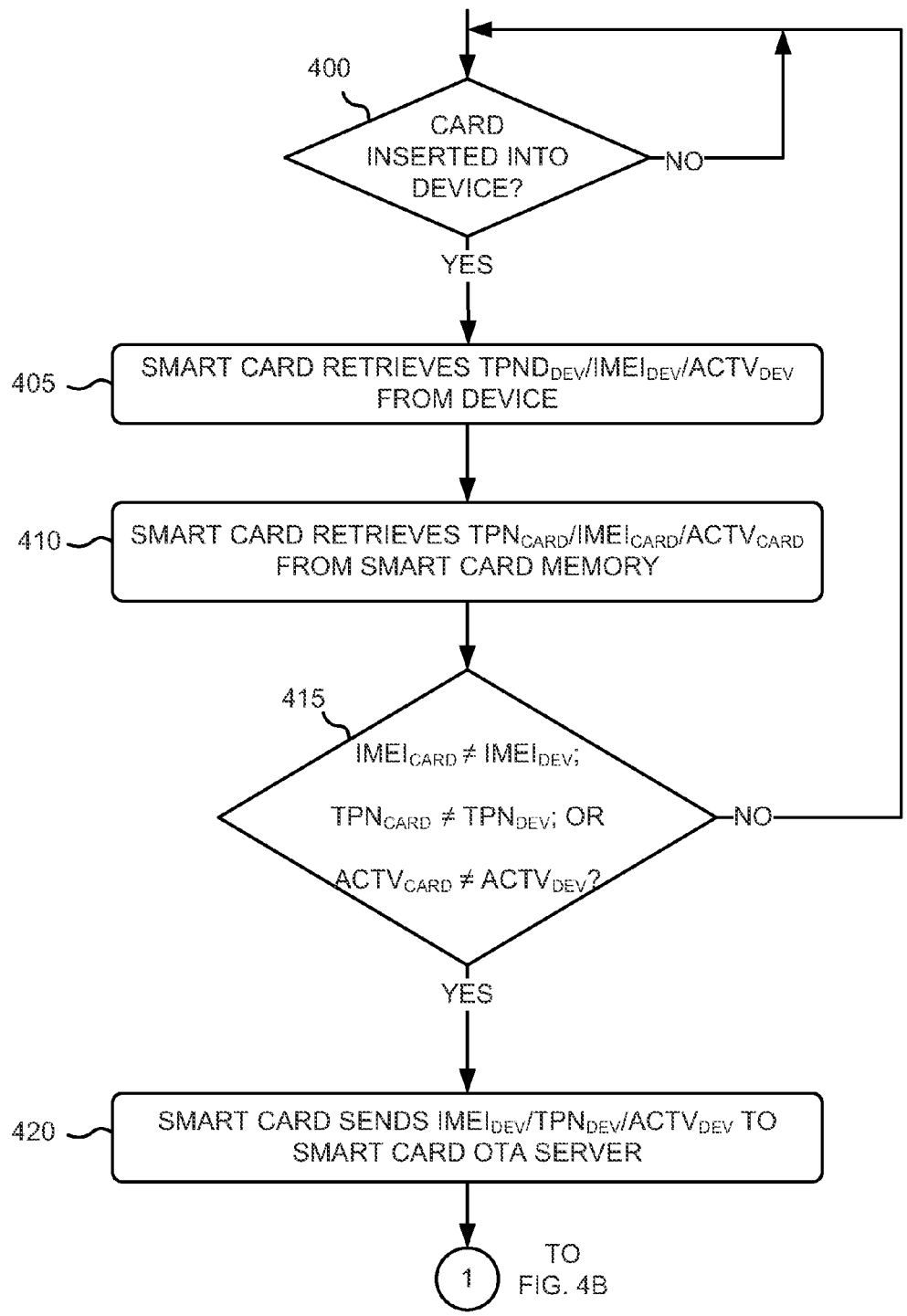
FIGS. 4A & 4B are flow diagrams illustrating an exemplary process for implementing smart card driven device configuration changes based on the use of a Terminal Profile Number (TPN), a device identifier, (e.g., IMEI), or an Application Configuration Tracking Value (ACTV) stored in both the smart card and the device into which the smart card is inserted.
Figure 4B:
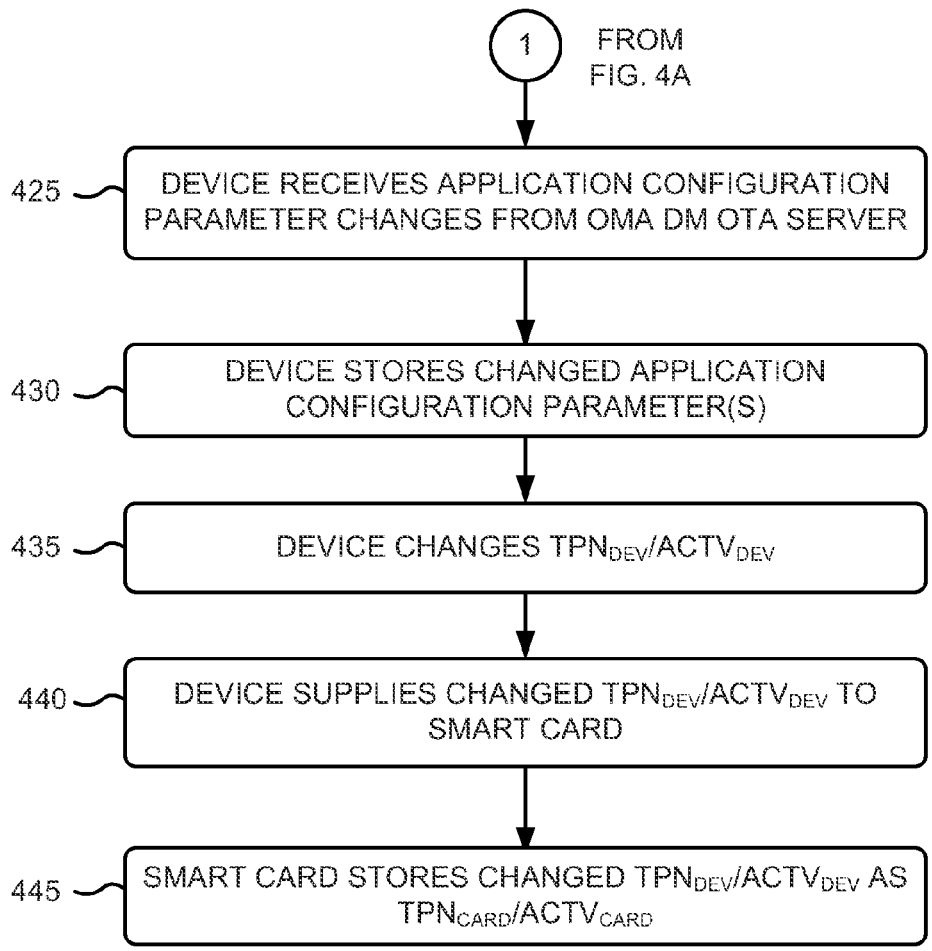

FIGS. 4A and 4B are flow diagrams illustrating an exemplary process for implementing smart card driven device configuration changes based on the use of Terminal Profile Numbers (TPNs), device identifiers (e.g., IMEIs), or Application Configuration Tracking Values (ACTVs) stored in both the smart card and the device into which the smart card is inserted. The exemplary process of FIGS. 4A & 4B may be implemented by smart card 120 in conjunction with device 110. The exemplary process of FIGS. 4A and 4B is described with reference to the exemplary messaging diagram of FIG. 5.

The exemplary process may include determining if smart card 120 has been inserted into device 110 (block 400). If smart card 120 has been inserted into device 110, smart card 120 ray retrieve TPN, IMEI, and/or ACTV values (i.e., $TPN_{DEV}$, $IMEI_{DEV}$, $ACTV_{DEV}$) stored in device 110 (block 405). The TPN number stored in device 110 may include one or more parameters, originally set by the manufacture of device 110, that may specify device 110's hardware and/or software. Though an IMEI is described herein by way of example, any type of device (or subscriber) identifier may be used for identifying device 110. Other examples of device/subscriber identifiers that may be used herein include an International Mobile Subscriber identity (IMSI), a Mobile Equipment Identifier (MEID), an Electronic Serial Number (ESN), or a Mobile Station International Subscriber Directory Number (MSISDN).

Smart card 120 may retrieve the TPN, IMEI, and/or ACTV values (i.e., $TPN_{CARD}$, $IMEI_{CARD}$, $ACTV_{CARD}$) previously stored in memory 320 of smart card 120 (block 410). Smart card 120 may have previously received an IMEI number and TPN from device 110 (i.e., during block 440 below). The ACTV value may include a parameter that may initially be set to zero if smart card 120 has never before been inserted into a device (e.g., device 110). As described with respect to block 445 below, after smart card 120 has been inserted into a device for a first time, smart card 120 will change the ACTV value such that it is non-zero. The ACTV value may change each time that application configuration parameter changes are received at device 110 (e.g., changes in APN, NAI, MMS data, WAP data, application keys, etc.)

Figure 5:
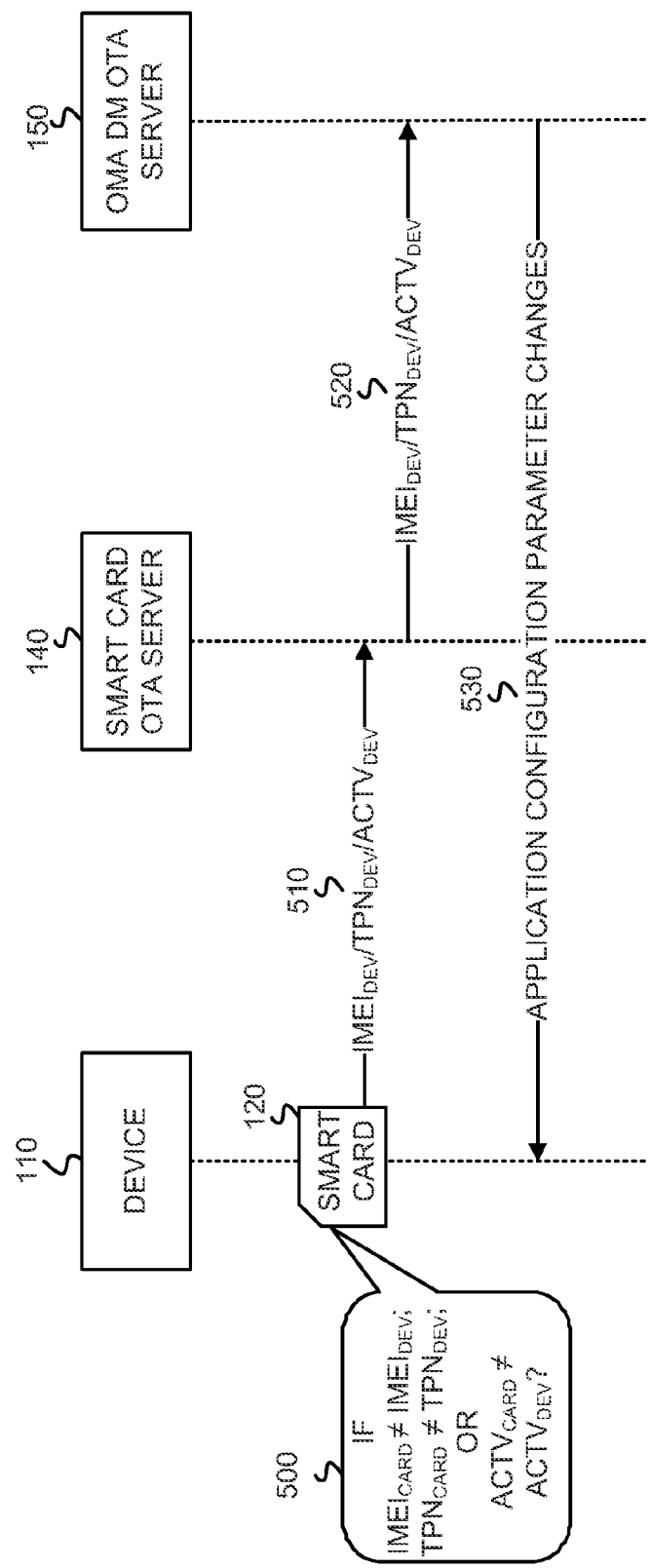
FIG. 5 is a messaging diagram associated with the exemplary process of FIGS. 4A & 4B.

Smart card 120 may determine if $IMEI_{CARD}$ is not equal to $IMEI_{DEV}$, if $TPN_{CARD}$ is not equal to $TPN_{DEV}$, or if $ACTV_{CARD}$ is not equal to $ACTV_{DEV}$ (block 415). The messaging diagram of FIG. 5 depicts smart card 120 determining 500 if $IMEI_{CARD}$ is not equal to $IMEI_{DEV}$, if $TPN_{CARD}$ is not equal to $TPN_{DEV}$, or if $ACTV_{CARD}$ is not equal to $ACTV_{DEV}$. If smart card 120 determines that $IMEI_{CARD}$ is not equal to $IMEI_{DEV}$, $TPN_{CARD}$ is not equal to $TPN_{DEV}$, or $ACTV_{CARD}$ is not equal to $ACTV_{DEV}$, then smart card 120 may send the values for TPN, IMEI and/or ACTV retrieved from device 110 to smart card OTA server 130 (block 420). The messaging diagram of FIG. 5 depicts smart card 120 sending $IMEI_{DEV}$, $TPN_{DEV}$ and/or $ACTV_{DEV}$ to smart card OTA server 140. Smart card OTA server 140 may then relay the values for TPN, IMEI and/or ACTV to OMA DM OTA server 150, or to another intermediate device, server, or system. The messaging diagram of FIG. 5 depicts smart card OTA server 140 relaying $IMEI_{DEV}$, $TPN_{DEV}$ and/or $ACTV_{DEV}$, to OMA DM OTA server 150.

Device 110 may receive application parameter changes from OMA DM OTA server 140 (block 425). OMA DM OTA server 140, based on the TPN, IMEI and/or ACTV values originally sent by smart card 120, may determine any changes in application configuration parameters that may need to be supplied to device 110 for the user of device 110 to receive appropriate services associated with the operation of device 110. The changes in application configuration parameters may include changes in APN, NAI, MMS data, WAP data, application keys, and/or other parameters associated with the operation of device 110 and with network communication services provided to device 110. The messaging diagram of FIG. 5 depicts OMA DM OTA server 150 returning application configuration parameter changes 530 to device 110.

Device 110 may store the changed application parameter(s) (block 430). For example, device 110 may store the changed application parameter(s) received from OMA DM OTA server 140 in main memory 230, ROM 240, or storage device 250. Device 110 may change the TPN and/or ACTV values (i.e., $TPN_{DEV}$, $ACTV_{DEV}$) stored in device 110 (block 435). The TPN and/or ACTV values may act as "change counters" with respect to changes in application configuration parameters received from OMA DM OTA server 140. Therefore, processing unit 220 of device 110 may increment the TPN and/or ACTV values to new, changed values that are different than the values for TPN and/or ACTV prior to device 110 receiving the changed application configuration parameters. Device 110 may supply the changed TPN and/or ACTV values (i.e., $TPN_{DEV}$, $ACTV_{DEV}$) to smart card 120 (block 440). Processing unit 220 may send the changed TPN and/or ACTV values to smart card 120 via bus 210 and I/O circuitry 300.

Smart card 120 may replace the values of TPN and/or ACTV stored in smart card 120 with the changed TPN and/or ACTV values received from device 110 (i.e., $TPN_{CARD}$, $ACTV_{CARD}$ values stored in smart card 120 replaced with $TPN_{DEV}$, $ACTV_{DEV}$ values from device 110). For example, processing unit 310 may set the previously stored $TPN_{CARD}$ value equal to the $TPN_{DEV}$ received from device 110. Additionally or alternatively, processing unit 310 may set the previously stored $ACTV_{CARD}$ value equal to the $ACTV_{DEV}$ value received from device 110.

Figure 6:
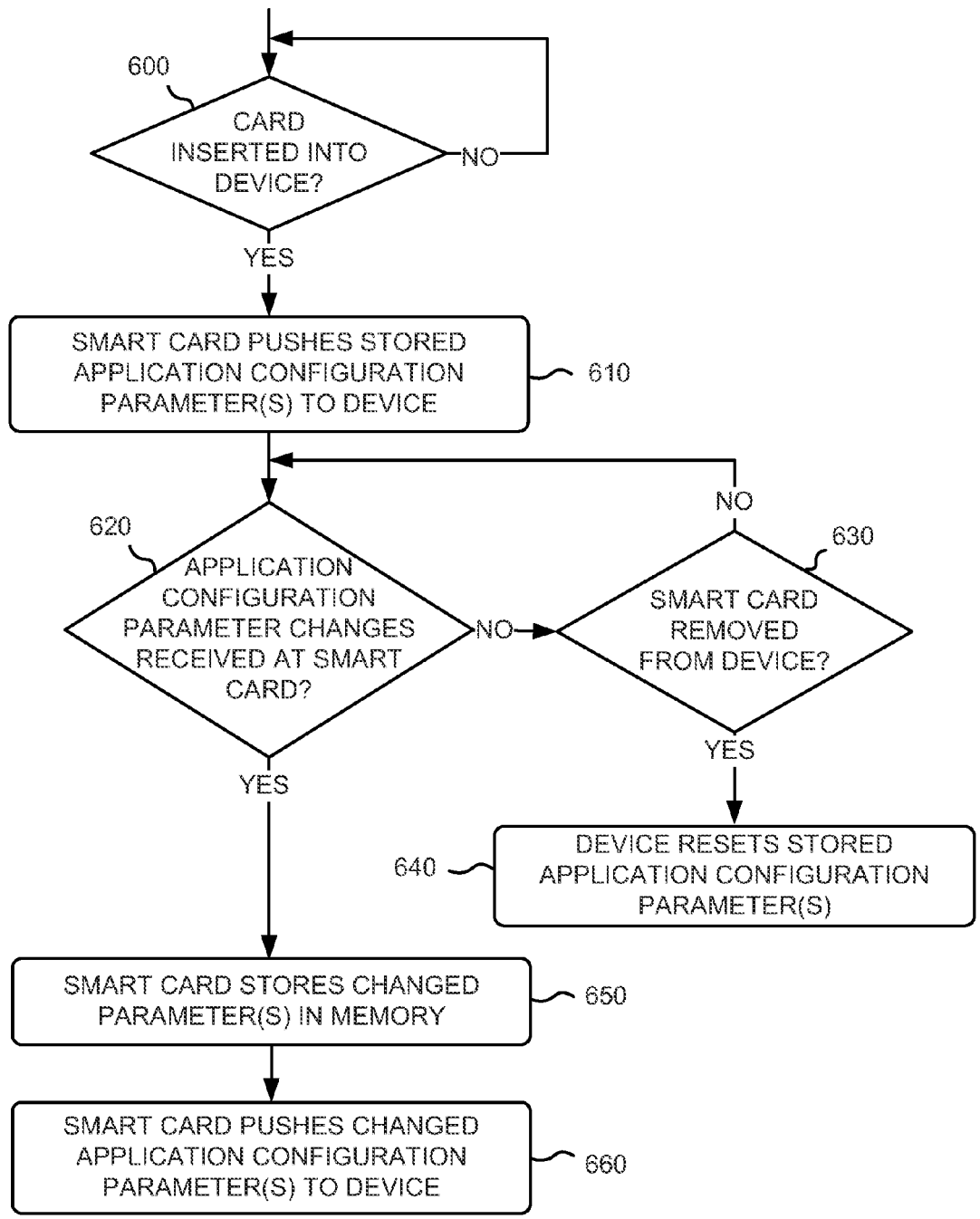
FIG. 6 is a flow diagram illustrating an exemplary process for implementing smart card driven device configuration changes where the smart card, instead of an OTA server, stores and supplies the application configuration parameter changes to the device.

FIG. 6 is a flow diagram illustrating an exemplary process for implementing smart card driven device configuration changes where smart card 120, instead of an OTA server, stores and supplies the application configuration parameter changes to device 110. The exemplary process of FIG. 6 may be implemented by smart card 120 in conjunction with device 110. The exemplary process of FIG. 6 is described with reference to the exemplary messaging diagram of FIG. 7.

Figure 7:
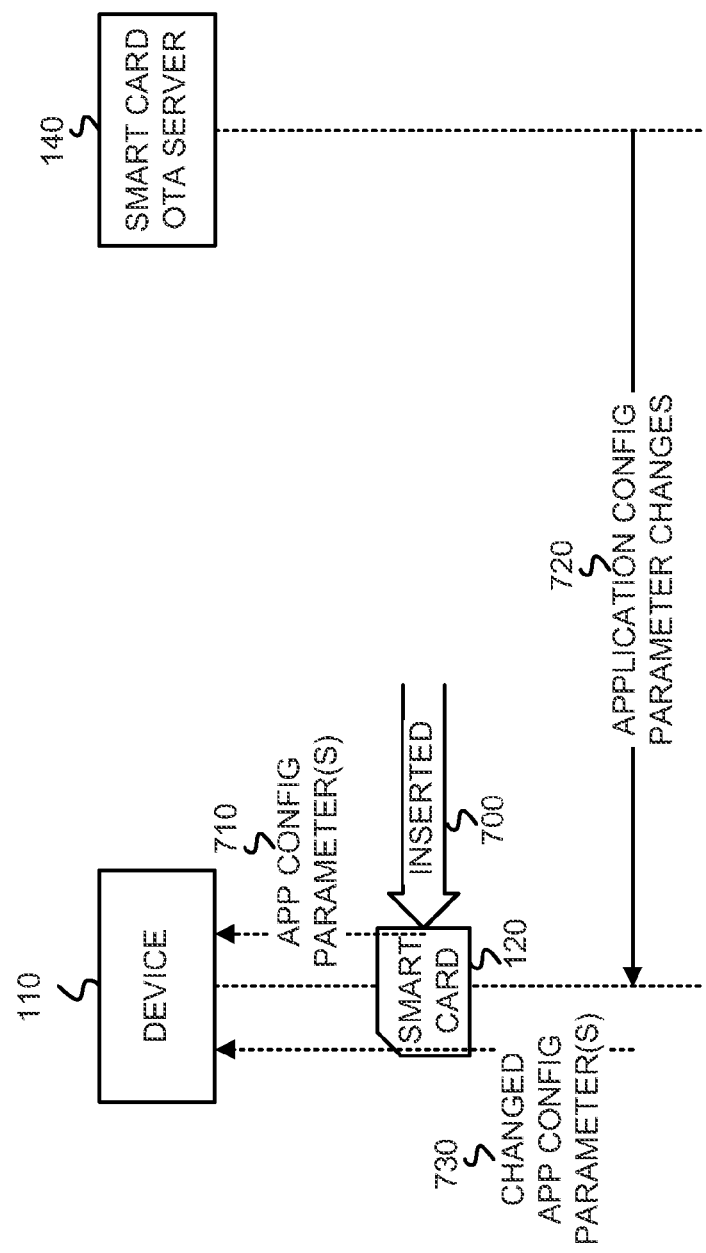
FIG. 7 is a messaging diagram associated with the exemplary process of FIG. 6.

The exemplary process may include determining if smart card 120 has been inserted into device 110 (block 600). The messaging diagram of FIG. 7 depicts smart card 120 being inserted 700 into device 110. If smart card has been inserted into device 110, smart card 120 may push the application configuration parameter(s) stored in memory 320 to device 110 (block 610). Smart card 120 may have previously received application configuration parameters (APN, NAI, MMS data, WAP data, application keys, etc.) from smart card OTA server 140 and may have stored those parameters in memory 320. Therefore, smart card 120, upon insertion into device 110, automatically supplies device 110 with application configuration parameters that may be used in the operation of device 110. The messaging diagram of FIG. 7 depicts smart card 120 supplying the application configuration parameters 710 to device 110.

Smart card 120 may determine if application parameter changes have been received at smart card 120 (block 620). Smart card OTA server 140 may automatically send updated application configuration parameters to smart card 120. For example, as shown in the messaging diagram of FIG. 7, smartcard OTA server 140 may send application configuration parameter changes 720 to smart card 120. If application configuration parameter changes have not been received at smart card 120, then smart card 120 may determine if it has been removed from device 110 (block 630). If smart card 120 has not been removed from device 110 (NO—block 630), then the exemplary process may return to block 620. If smart card 120 has been removed from device 110 (YES—block 630), then device 110 may reset the application configuration parameters stored in device 110 (block 640). Resetting the application configuration parameters may include changing them back to their default values.

Returning to block 620, if application configuration parameter changes are received at smart card 120, then smart card 120 may store the changed application configuration parameters in memory 320 (block 650). Smart card 120 may then push the changed application configuration parameter(s) to device 110 (block 660). The messaging diagram of FIG. 7 depicts the changed application configuration parameters 730 being supplied via smartcard 120 to device 110. Upon receipt of the changed application configuration parameters, device 110 may store the parameters in main memory 230, ROM 420 or storage device 250 for future use.

As described herein, exemplary embodiments utilize a smart card inserted into a device (e.g., a mobile telephone) to drive configuration changes associated with the operation of the device. Such configuration changes may include changes in APNs, NAIs, MMS information, WAP information, application keys, and other data associated with the operation of the mobile device.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 4A, 4B and 6, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    determining if a smart card has been inserted into a device;
    retrieving, if the smart card has been inserted into the device, application configuration parameters previously stored in the smart card;
    pushing, responsive to the smart card being inserted into the device, the retrieved application configuration parameters, from the smart card to the device, for use in device operations;
    receiving subsequent application configuration parameter changes at the smart card from an Over the Air (OTA) server;
    storing the application configuration parameter changes at the smart card;
    pushing the received application parameter changes from the smart card to the device for use in device operations;
    determining if the smart card has been removed from the device; and
    resetting the application configuration parameter changes stored in the device to default values responsive to the smart card being removed from the device.

2. The method of claim 1, wherein the smart card comprises a Universal Integrated Circuit Card (UICC), a removable user identity card (R-UIM), a subscriber identity module (SIM), a universal subscriber identity module (USIM), or an Internet Protocol (IP) multimedia services identity module (ISIM).

3. The method of claim 1, wherein the device comprises a device having wireless communication mechanisms.

4. The method of claim 1, wherein the device comprises one of a cellular radiotelephone, a smart phone, a personal digital assistant (PDA), a laptop computer, a palmtop computer, a gaming device, a media player device, a tablet computer, or a digital camera.

5. The method of claim 1, wherein the device comprises a communication device that uses a Universal Integrated Circuit Card (UICC)-based subscriber identity module (SIM) for authentication and application enabling.

6. The method of claim 1, wherein the application configuration parameters comprise one or more of an Access Point Name (APN), a Network Access Identifier (NAI), Multi-Media Messaging Service (MMS) information, Wireless Application Protocol (WAP) information, or one or more application keys.

7. A smart card, comprising:
    input/output circuitry configured to interface with a device;
    a memory;
    a processing unit configured to:
        retrieve from the device, when the smart card is inserted into the device, a first application configuration change counter that tracks changes in one or more application configuration parameters associated with operation of the device,
        compare the retrieved first application configuration change counter with a second application configuration change counter previously stored in the memory of the smart card,
        cause the retrieved first application configuration change counter to be sent to an Over The Air (OTA) server based on the comparison,
        receive a modified version of the first application configuration change counter from the device via the input circuitry, wherein the device generated the modified version of the first application configuration change counter value based on receiving changes in the one or more application configuration parameters from the OTA server, and
        replace, in the memory, the previously stored second application configuration change counter with the modified version of the first application configuration change counter.

8. The smart card of claim 7, wherein the one or more application configuration parameters comprise one or more of an Access Point Name (APN), a Network Access Identifier (NAI), Multi-Media Messaging Service (MMS) information, Wireless Application Protocol (WAP) information, or application keys.

9. The smart card of claim 7, wherein, when comparing the retrieved first application configuration change counter with the second application configuration change counter previously stored in the memory, the processing unit is further configured to:
    determine if the first application configuration change counter is different than the previously stored second application configuration change counter.

10. The smart card of claim 7, wherein the smart card comprises a Universal Integrated Circuit Card (UICC), a removable user identity card (R-UIM), a subscriber identity module (SIM), a universal subscriber identity module (USIM), or an Internet Protocol (IP) multimedia services identity module (ISIM).

11. The smart card of claim 7, wherein the first application configuration change counter comprises a Terminal Profile Number (TPN) or an Application Configuration Tracking Value (ACTV).

12. A method, comprising:
retrieving, at a smart card, a first application configuration change counter that tracks changes in one or more application configuration parameters associated with operation of a device with which the smart card is used;
comparing, at the smart card, the retrieved first application configuration change counter with a second application configuration change counter previously stored in the smart card to produce a first comparison;
sending the retrieved first application configuration change counter to an Over The Air (OTA) server based on the first comparison;
receiving, at the device from the OTA server, changes in the one or more application configuration parameters;
modifying, at the device, the first application configuration change counter; and
replacing, in the smart card, the previously stored second application configuration change counter with the modified first application configuration change counter.

13. The method of claim 12, wherein the one or more application configuration parameters comprise one or more of an Access Point Name (APN), a Network Access Identifier (NAI), Multi-Media Messaging Service (MMS) information, Wireless Application Protocol (WAP) information, or application keys.

14. The method of claim 12, wherein retrieving the first application configuration change counter comprises:
retrieving, at the smart card, the first application configuration change counter when the smart card is inserted into the device.

15. The method of claim 12, wherein sending the retrieved first application configuration change counter to an Over The Air (OTA) server further comprises:
sending the first application configuration change counter to the OTA server if the first comparison indicates that the first application configuration change counter is different than the previously stored second application configuration change counter.

16. The method of claim 12, further comprising:
retrieving, at the smart card from the device, a first device identifier associated with the device, in conjunction with retrieving the first application configuration change counter.

17. The method of claim 16, further comprising:
comparing, at the smart card, the retrieved first device identifier with a second device identifier previously stored in the smart card to produce a second comparison, and
wherein sending the retrieved first application configuration change counter to the OTAs server is further based on the second comparison.

18. The method of claim 12, wherein the smart card comprises a Universal Integrated Circuit Card (UICC), a removable user identity card (R-UIM), a subscriber identity module (SIM), a universal subscriber identity module (USIM), or an Internet Protocol (IP) multimedia services identity module (ISIM).

19. The method of claim 12, wherein the device comprises a device having wireless communication mechanisms and wherein the device comprises one of a cellular radiotelephone, a smart phone, a personal digital assistant (PDA), a laptop computer, a palmtop computer, a gaming device, a media player device, a tablet computer, or a digital camera.

20. The method of claim 12, wherein modifying the first application configuration change counter further comprises incrementing the first application configuration change counter, and wherein replacing the previously stored second application configuration change counter further comprises replacing the previously stored second application configuration change counter with the incremented first application configuration change counter.

\* \* \* \* \*